(12) United States Patent
Song et al.

(10) Patent No.: US 12,294,105 B2
(45) Date of Patent: May 6, 2025

(54) SECONDARY BATTERY

(71) Applicant: LG Energy Solution, Ltd., Seoul (KR)

(72) Inventors: Dae-Woong Song, Daejeon (KR);
Sang-Hun Kim, Daejeon (KR);
Min-Hyeong Kang, Daejeon (KR);
Hyung-Kyun Yu, Daejeon (KR);
Hun-Hee Lim, Daejeon (KR); Soo-Ji Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/719,902

(22) Filed: Apr. 13, 2022

(65) Prior Publication Data
US 2022/0336914 A1 Oct. 20, 2022

(30) Foreign Application Priority Data

Apr. 15, 2021 (KR) .................. 10-2021-0049400
Jan. 4, 2022 (KR) .................. 10-2022-0001216

(51) Int. Cl.
*H01M 50/342* (2021.01)
*H01M 50/193* (2021.01)
*H01M 50/375* (2021.01)

(52) U.S. Cl.
CPC ........ *H01M 50/342* (2021.01); *H01M 50/193* (2021.01); *H01M 50/375* (2021.01)

(58) Field of Classification Search
None
See application file for complete search history.

(56) References Cited

U.S. PATENT DOCUMENTS

| 5,874,513 A | 2/1999 | Watanabe et al. |
| 7,095,769 B2 | 8/2006 | Yoon et al. |
| 7,122,276 B2 | 10/2006 | Gu |
| 8,546,499 B2 | 10/2013 | Garroff et al. |

(Continued)

FOREIGN PATENT DOCUMENTS

| EP | 3112151 A1 | 1/2017 |
| EP | 3916830 A1 | 12/2021 |

(Continued)

OTHER PUBLICATIONS

International Search Report for PCT/KR2022/005500 mailed Jul. 25, 2022. 3 pgs.

(Continued)

*Primary Examiner* — Matthew T Martin
*Assistant Examiner* — Ankith R Sripathi
(74) *Attorney, Agent, or Firm* — Lerner David LLP

(57) ABSTRACT

Disclosed herein is a secondary battery having a vent member. The secondary battery may include an electrode assembly to which an electrode lead is attached, a case including an accommodation portion. The accommodation portion may be defined by a bent side and a sealing portion. The accommodation portion may be configured to receive the electrode assembly and seal the electrode assembly therein. The sealing portion may contain a sealant resin to form a seal around the electrode assembly. The sealing portion may include an extension adjacent to and extending from the bent side. The vent member may be disposed at least partially in the extension. The vent member may include a vent resin having a lower melting point than the sealant resin.

29 Claims, 8 Drawing Sheets

(56) References Cited

U.S. PATENT DOCUMENTS

| | | |
|---|---|---|
| 8,597,775 B2 | 12/2013 | Rhee et al. |
| 2003/0148173 A1 | 8/2003 | Gu |
| 2004/0038126 A1 | 2/2004 | Gu |
| 2008/0213659 A1 | 9/2008 | Yamada |
| 2009/0311583 A1* | 12/2009 | Wu .................... H01M 50/171 |
| | | 429/185 |
| 2011/0104468 A1 | 5/2011 | Rhee et al. |
| 2011/0104527 A1 | 5/2011 | Choi et al. |
| 2011/0274955 A1 | 11/2011 | Park et al. |
| 2013/0143077 A1 | 6/2013 | Yebka et al. |
| 2014/0030564 A1 | 1/2014 | Lee |
| 2016/0020434 A1 | 1/2016 | Kwon et al. |
| 2016/0226042 A1* | 8/2016 | Hartmann ............ H01M 50/213 |
| 2017/0244082 A1* | 8/2017 | Ahn .................... H01M 50/333 |
| 2018/0026291 A1 | 1/2018 | Okada |
| 2018/0114964 A1 | 4/2018 | Kim et al. |
| 2020/0058973 A1* | 2/2020 | Golubkov ............ H01M 50/30 |
| 2020/0067029 A1* | 2/2020 | Park .................... H01M 50/105 |
| 2020/0220191 A1 | 7/2020 | Okada et al. |
| 2020/0251707 A1 | 8/2020 | Han et al. |
| 2020/0321577 A1 | 10/2020 | Kim et al. |
| 2021/0257696 A1 | 8/2021 | Mochizuki et al. |
| 2021/0288383 A1* | 9/2021 | Hong .................... C09D 127/16 |
| 2021/0351463 A1 | 11/2021 | Park et al. |

FOREIGN PATENT DOCUMENTS

| | | |
|---|---|---|
| JP | H06049808 A | 2/1994 |
| JP | 2001072788 A | 3/2001 |
| JP | 2001093489 A | 4/2001 |
| JP | 2001273884 A | 10/2001 |
| JP | 2001283800 A | 10/2001 |
| JP | 2003242952 A | 8/2003 |
| JP | 2007265738 A | 10/2007 |
| JP | 2008130370 A | 6/2008 |
| JP | 2008192451 A | 8/2008 |
| JP | 2010086753 A | 4/2010 |
| JP | 2010244865 A | 10/2010 |
| JP | 2010251151 A | 11/2010 |
| JP | 2011524822 A | 9/2011 |
| JP | 2013118186 A | 6/2013 |
| JP | 2013522844 A | 6/2013 |
| JP | 2016081705 A | 5/2016 |
| JP | 2017062872 A | 3/2017 |
| JP | 2018018582 A | 2/2018 |
| JP | 2018525804 A | 9/2018 |
| JP | 2019142018 A | 8/2019 |
| JP | 2019207781 A | 12/2019 |
| JP | 2020534650 A | 11/2020 |
| KR | 100372475 B1 | 5/2003 |
| KR | 20030066895 A | 8/2003 |
| KR | 20040017094 A | 2/2004 |
| KR | 20050010001 A | 1/2005 |
| KR | 20060035885 A | 4/2006 |
| KR | 20080036257 A | 4/2008 |
| KR | 20090064041 A | 6/2009 |
| KR | 20110107448 A | 10/2011 |
| KR | 20110131259 A | 12/2011 |
| KR | 101245284 B1 | 3/2013 |
| KR | 101264527 B1 | 5/2013 |
| KR | 20130048419 A | 5/2013 |
| KR | 20140015769 A | 2/2014 |
| KR | 101452945 B1 | 10/2014 |
| KR | 2015-0055775 A | 5/2015 |
| KR | 20150121914 A | 10/2015 |
| KR | 20150134304 A | 12/2015 |
| KR | 101614185 B1 | 4/2016 |
| KR | 101653305 B1 | 9/2016 |
| KR | 20160118585 A | 10/2016 |
| KR | 20170020996 A | 2/2017 |
| KR | 20170103236 A | 9/2017 |
| KR | 101959134 B1 | 3/2019 |
| KR | 20190023648 A | 3/2019 |
| KR | 20190047104 A | 5/2019 |
| KR | 20190123059 A | 10/2019 |
| KR | 102159368 B1 | 9/2020 |
| KR | 20200114784 A | 10/2020 |
| WO | 2015129426 A1 | 9/2015 |

OTHER PUBLICATIONS

International Search Report for Application No. PCT/KR2022/005504 mailed Jul. 27, 2022, pp. 1-4.
EESR for Application No. 22788512.6 dated Mar. 12, 2024. 9 pgs.
International Search Report for Application No. PCT/KR2022/005441 mailed Aug. 5, 2022, pp. 1-3.

* cited by examiner

SECONDARY BATTERY

CROSS-REFERENCE TO RELATED APPLICATIONS

The present application claims priority to Korean Patent Application No. 10-2021-0049400 filed on Apr. 15, 2021, and Korean Patent Application No. 10-2022-0001216 filed on Jan. 4, 2022, the disclosures of which are incorporated herein by reference in their entirety.

TECHNICAL FIELD

The present disclosure relates to a secondary battery, and more particularly, to a secondary battery having a vent member.

BACKGROUND ART

Secondary batteries which are highly applicable to various products and exhibit superior electrical properties such as high energy density, etc. Secondary batteries are commonly used not only in portable devices but also in electric vehicles (EVs) or hybrid electric vehicles (HEVs) driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like.

The secondary battery generally has a structure in which an electrode assembly including at least one unit cell having a positive electrode/separator/negative electrode structure is accommodated in a case of a laminate sheet in which an outer layer, a metal barrier layer and a sealant layer are sequentially laminated, and a sealant resin of the sealant layer is fused to seal the electrode assembly is sealed.

In the conventional secondary battery, the battery may ignite due to various causes such as a short circuit inside the secondary battery, overcharge or overdischarge, temperature control, or the like. At this time, thermal propagation where the temperature inside the secondary battery rises rapidly and simultaneously the heat is transferred to neighboring cells may be generated, which may further increase the fire.

In order to minimize damage to the electrode caused by gas when thermal propagation occurs—i.e., when the internal temperature of the secondary battery rises, directional venting characteristic is required to discharge the gas in one direction. However, the conventional secondary battery has a problem in that it is difficult to induce gas discharge in a specific direction.

Therefore, the present disclosure is directed to providing a secondary battery with improved safety by inducing gas discharge in a specific direction.

BRIEF SUMMARY OF THE INVENTION

Disclosed herein are secondary batteries with vent members.

In accordance with an aspect of the present disclosure, a secondary battery is provided. A secondary battery according to this aspect, may include an electrode assembly, an electrode lead attached to the electrode assembly, a case including an accommodation portion and a vent member. The accommodation portion may be defined by a bent side and a sealing portion. The accommodation portion may be configured to receive the electrode assembly therein. The sealing portion may contain a sealant resin to form a seal around the electrode assembly. The sealing portion may include an extension adjacent to and extending away from the bent side. The vent member may be disposed at least partially in the extension. The vent member may include a resin (hereinafter referred to as a "vent resin") having a lower melting point than the sealant resin.

Continuing in accordance with this aspect, the vent member may be disposed at least partially in a bat ear region.

Continuing in accordance with this aspect, the secondary battery may include a lead film surrounding an outer surface of the electrode lead. The lead film may be disposed between the electrode lead and the sealing portion. The vent member may extend through the accommodation portion. A first end of the vent member may be spaced apart from the lead film in the sealing portion. A second end of the vent member may at least partially overlap or contact the lead film in the accommodation portion.

Continuing in accordance with this aspect, the secondary battery may further include a lead film surrounding an outer surface of the electrode lead. The lead film may be disposed between the electrode lead and the sealing portion. The electrode lead may extend away from the case along a Y-axis. The vent member may include a first portion and a second portion. The first portion may extend along an X-axis orthogonal to the Y-axis between the lead film and the second portion. The second portion may extend along the Y-axis.

Continuing in accordance with this aspect, the secondary battery may further include a lead film surrounding an outer surface of the electrode lead. The lead film may be disposed between the electrode lead and the sealing portion. The electrode lead may extend away from the case along a Y-axis. The vent member may include a first portion and a second portion. The first portion may extend along a first direction nonparallel to the Y-axis between the lead film and the second portion. The second portion may extend along a second direction orthogonal to the first direction. The vent member may have an L shape. The vent member may include a tapering section at an intersection of the first and second portions. The tapering section may extend into the accommodation portion. The first portion may be a bridge portion at least partially overlapping the lead film. An outer end of the first portion may be spaced apart from an inner end of the extension. The first portion may be located in the accommodation portion. The second portion may not overlap or contact the lead film.

Continuing in accordance with this aspect, the vent member may define a variable width. The variable width may decrease along a venting direction.

Continuing in accordance with this aspect, the vent member may define any of a circular, oval, stepped, triangular and trapezoidal shape.

Continuing in accordance with this aspect, the vent member may define a variable thickness. The variable thickness may decrease along a venting direction. A region of the vent member overlapping or contacting the lead film may be 1% to 30% of a region of the lead film not overlapping or contacting the electrode lead.

Continuing in accordance with this aspect, the vent resin may include a linear low-density polyethylene having a comonomer with a carbon number of 6 or more. The comonomer with a carbon number of 6 or more may be 15 weight % or less, based on 100 weight % of the linear low-density polyethylene.

Continuing in accordance with this aspect, the vent member may melt at 100° C. to 120° C. to vent gases from the accommodation portion to an exterior of the secondary battery. The vent member may vent gases from the accommodation portion when the accommodation portion is at a pressure of 1.5 atm or above.

Continuing in accordance with this aspect, the vent member may have a maximum sealing strength of less than 6 kgf/15 mm at 100° C. or above.

Continuing in accordance with this aspect, the vent member may have an average sealing strength of less than 4.5 kgf/15 mm at 100° C. or above.

Continuing in accordance with this aspect, the vent member may have a maximum sealing strength of 6 kgf/15 mm or more at room temperature to 60° C.

Continuing in accordance with this aspect, the vent member may have an average sealing strength of 4.5 kgf/15 mm or more at room temperature to 60° C.

Continuing in accordance with this aspect, the vent resin may be polymerized in the presence of a metallocene catalyst.

Continuing in accordance with this aspect, the vent resin may have a poly dispersity index (PDI) of 4 or less.

Continuing in accordance with this aspect, a difference between a crystallization temperature of the sealant resin and a crystallization temperature of the vent resin may be 10° C. or less. The vent resin may have a melting point of 100° C. to 130° C.

Continuing in accordance with this aspect, the vent resin may have a weight-average molecular weight of 100,000 g/mol to 400,000 g/mol.

Continuing in accordance with this aspect, the secondary battery may be a pouch-type secondary battery.

Continuing in accordance with this aspect, the vent member may have a maximum sealing strength of less than 3 kgf/15 mm at 120° C. or more.

Continuing in accordance with this aspect, the vent member may have an average sealing strength of less than 2 kgf/15 mm at 120° C. or more.

In the secondary battery according to an embodiment of the present disclosure, since the vent member containing a vent resin having a lower melting point than the sealant resin of the case is provided in an extension of the sealing portion, it is possible to induce the gas to be discharged to the extension, thereby improving the safety.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings shown herein.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

A secondary battery according to an embodiment of the present disclosure includes an electrode assembly to which an electrode lead is attached; a case including an accommodation portion for accommodating the electrode assembly and a sealing portion containing a sealant resin and formed to seal the electrode assembly; and a lead film configured to surround a part of an outer surface of the electrode lead and interposed between the electrode lead and the sealing portion of the case, wherein the sealing portion includes an extension, and a vent member containing a vent resin having a lower melting point than the sealant resin is included in the extension.

Figure 1:
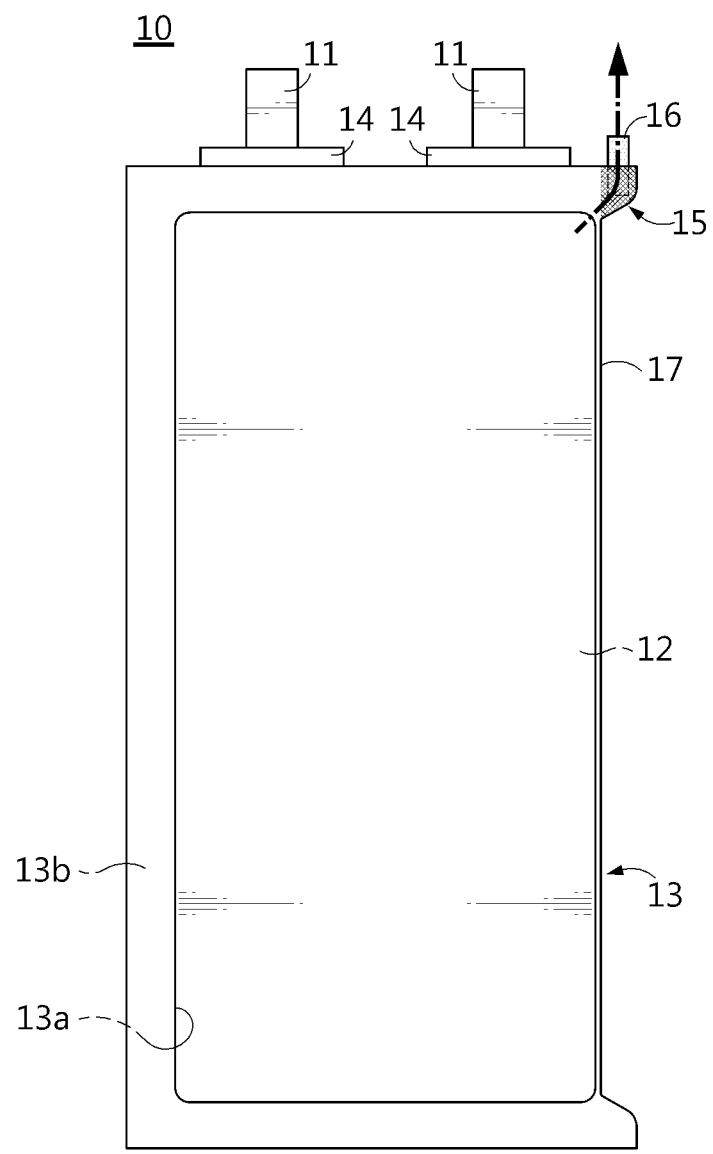
FIG. 1 shows a plan view of a secondary battery according to an embodiment of the present disclosure.

FIG. 1 shows a secondary battery according to an embodiment of the present disclosure. Referring to FIG. 1, a secondary battery 10 according to an embodiment of the present disclosure includes an electrode assembly 12 to which an electrode lead 11 is attached, and a case 13.

The electrode assembly 12 includes a positive electrode plate, a negative electrode plate and a separator. In the electrode assembly 12, a positive electrode plate and a negative electrode plate may be sequentially laminated with a separator being interposed therebetween.

The positive electrode plate may include a positive electrode current collector made of a metal thin film having excellent conductivity, for example an aluminum (Al) foil, and a positive electrode active material layer coated on at least one surface thereof. In addition, the positive electrode plate may include a positive electrode tab made of a metal material, for example an aluminum (Al) material, at one side end thereof. The positive electrode tab may protrude from one side end of the positive electrode plate. The positive electrode tab may be welded to one side end of the positive electrode plate, or be bonded thereto using a conductive adhesive.

The negative electrode plate may include a negative electrode current collector made of a conductive metal thin film, for example a copper (Cu) foil, and a negative electrode active material layer coated on at least one surface thereof. In addition, the negative electrode plate may include a negative electrode tab formed of a metal material, for example a copper (Cu) or nickel (Ni) material, at one side end thereof. The negative electrode tab may protrude from one side end of the negative electrode plate. The negative electrode tab may be welded to one side end of the negative electrode plate, or be bonded thereto using a conductive adhesive.

The separator is interposed between the positive electrode plate and the negative electrode plate to electrically insulate the positive electrode plate and the negative electrode plate from each other, and may be formed in a porous membrane form so that lithium ions can pass between the positive electrode plate and the negative electrode plate. The separator may include, for example, a porous membrane using polyethylene (PE), or polypropylene (PP), or a composite film thereof.

An inorganic coating layer may be provided on the surface of the separator. The inorganic coating layer may have a structure in which inorganic particles are bonded to each other by a binder to form an interstitial volume between the particles.

The electrode assembly 12 may be a jelly-roll (winding-type) electrode assembly having a structure in which long sheet-type positive and negative electrodes are wound with a separator being interposed therebetween, a stacked (stack-type) electrode assembly having a structure in which a plurality of positive and negative electrodes cut into units of a predetermined size are sequentially stacked with a separator being interposed therebetween, a stack/folding type electrode assembly having a structure in which bi-cells or full-cells where positive and negative electrodes of a predetermined unit are stacked with a separator being interposed therebetween are wound, or the like.

Case 13 may include an accommodation portion 13a for accommodating the electrode assembly 12, a bent side 17, and a sealing portion 13b containing a sealant resin and formed to seal the electrode assembly 12. Bent side 17 is formed by bending adjacent portions (an upper case portion and a lower case portion) of case 13 to face each other as best shown in FIG. 1.

The sealing portion 13b may be sealed on three sides at the edge of the case 13. In the three-sided sealing structure, the case 13 is bent so that the accommodation portion 13a formed on the upper case and the lower case overlap to form the accommodation portion. After bending the case in this manner, the edges of the remaining three sides are sealed except for the bending portion which forms bent side 17.

The sealing portion 13b refers to, for example, a portion that is fused along the outer circumferential surface of the accommodation portion 13a to seal the electrode assembly 12. Sealing portion 13b may be fused by thermal fusion, ultrasonic fusion, or the like, but is not particularly limited as long as the sealing portion can be fused. Electrode assembly 12 is enclosed by three sides of sealing portion 13b and bent side 17 of case 13 as best shown in FIG. 1.

The electrode lead 11 may be accommodated in the case 13 so that a part thereof is exposed to the outside of the case 13. Secondary battery 10 according to an embodiment of the present disclosure includes a lead film 14 as shown in FIG. 1. The lead film 14 surrounds a part of the outer surface of the electrode lead 11, and is interposed between the electrode lead 11 and the sealing portion 13b of the case 13 in a region where the electrode lead 11 protrudes to help binding of the electrode lead 11 and the sealing portion 13b of the case 13.

In an embodiment of the present disclosure, the case 13 may be in a pouch form.

In this embodiment, case 13 may include an upper pouch and a lower pouch. If the case 13 includes an upper pouch and a lower pouch, after the upper pouch and the lower pouch are arranged so that the sealant resins thereof face each other, the facing sealant resins are fused to each other by heat and pressure to have a structure that seals the battery.

In an embodiment of the present disclosure, the case 13 may be provided in a film form having a multilayer structure including an outer layer for protection against external impacts, a metal barrier layer for blocking moisture, and a sealant layer for sealing the case.

The outer layer may include a polyester-based film using polyethylene terephthalate (PET), polybutylene terephthalate, polyethylene naphthalate, polybutylene naphthalate, co-polyester, polycarbonate, nylon, or the like, and may be configured in a single layer or multiple layers. The metal barrier layer may include aluminum, copper, or the like.

The sealant layer contains a sealant resin and may be configured in a single layer or multiple layers. The sealant resin may include polypropylene (PP), acid-modified polypropylene (PPa), random polypropylene, ethylene propylene copolymer, or two or more thereof. The ethylene propylene copolymer may include, but is not limited to, ethylene-propylene rubber, ethylene-propylene block copolymer, and the like.

The sealing portion 13b includes an extension 15. When the case 13 of the secondary battery is bent to seal edges of three sides except for the bent side, the edge of one sealed edge adjacent the bent side of the secondary battery may protrude outward. The extension 15 may be a bat ear region. Throughout this specification, the "bat ear region" refers to an extension of the sealing portion that protrudes to the outside of the battery, rather than in a direction in which the edge of the bent side 17 extends. The bat ear region is an example of an extension of the sealing portion protruding outward. Other embodiments may have differently shaped and sized extensions of the sealing portion.

In this case, since the sealing strength of the bent side 17 is greater than the sealing strength of the sealing portion, it is very likely that a vent will occur in the sealing portion, except for the sealing portion adjacent the bent side, so there is a high risk of damaging the lead tab, the bus bar, and the like.

After injecting electrolyte in the sealing portion except for the sealing portion adjacent the bent side (i.e, the extension), the case may be sealed again. Accordingly, if the vent member is included in the sealing portion except for the extension, the electrolyte may be attached to the vent member. In addition, as sealing is performed again after injecting the electrolyte, the sealing strength of the sealing portion except for the extension is greater than the sealing strength of the extension. Thus, a vent will more likely be induced in the extension instead of the rest of the sealing portion.

In a secondary battery according to an embodiment of the present disclosure, the extension 15 includes a vent member 16. The secondary battery 10 according to an embodiment of the present disclosure may induce gases to be discharged to the extension 15 spaced apart from the electrode lead, so it is possible to minimize the amount of gas vented to directly contact the electrode lead 11, thereby further improving the safety of the battery. That is, it is possible to minimize the amount of gas vented toward the side portion of the electrode lead 11, thereby further improving the safety of the battery. As shown by a directional arrow representing the direction of the exhaust gases in FIG. 1, the exhaust gases are directed away from electrode lead 11. The electrode lead 11 is a component whose temperature rises rapidly in abnormal situations such as overcharge or internal short circuit. Therefore, if direct contact between the vented gas and the electrode lead 11 is minimized, secondary battery safety may be improved. Throughout this specification, including the vent member 16 in the extension 15 means that the extension 15 and the vent member 16 may be at least partially overlapped.

The secondary battery 10 according to an embodiment of the present disclosure includes a vent member 16 containing a vent resin having a lower melting point than the sealant resin. Since the vent member 16 contains the vent resin having a lower melting point than the sealant resin, the vent member 16 is melts before the sealant resin as the temperature increases. The sealing strength of the portion where the vent member 16 is inserted is further lowered compared to the sealing strength of the case portion containing the sealant resin at high temperature, so that the venting characteristic may be readily implemented. Accordingly, it is possible to induce the extension 15 to be vented—i.e., serve as a conduit to release gases from the accommodation portion to an exterior of the secondary battery, due to a decrease in sealing strength when thermal propagation occurs, thereby effectively preventing the electrode lead 11 or the like from being damaged due to gas, flame, or the like.

Figure 2:
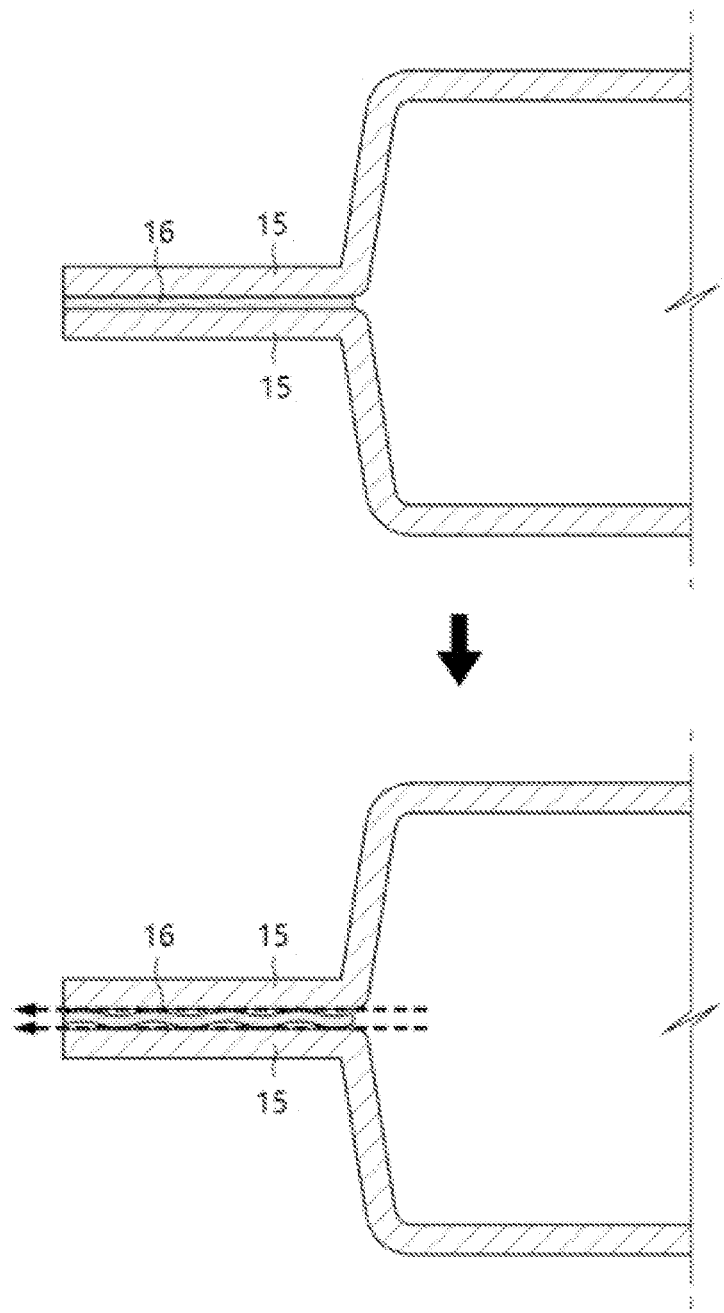
FIG. 2. is a schematic drawing showing vent formation in the secondary battery according to an embodiment of the present disclosure.

FIG. 2 is a schematic diagram showing vent formation in the secondary battery according to an embodiment of the present invention. Specifically, FIG. 2 is a cross-sectional view showing the vent member in the secondary battery according to an embodiment of the present invention.

Referring to FIG. 2, at a temperature at which the battery normally operates, the vent member 16 serves to seal the case 13 from the outside. If the temperature of the battery is excessively increased due to abnormal operation of the battery, the sealing strength of the portion into which the vent member 16 is inserted is reduced as the vent member 16 is melted. Accordingly, as the sealing strength of the portion into which the vent member 16 is inserted is lowered, a vent may be formed in this location to exhaust gases from the case. For example, as the pressure of the gas inside the battery is applied at the interface between the vent member 16 and the extension 15, a gap or vent is formed between the vent member 16 and the extension 15 to exhaust gases.

The vent member 16 may be attached to case 13 by means of thermal fusion. In another example, the vent member 16 and the case 13 may be overlapped by means of an adhesive such as glue. In another example, the vent member 16 and the case 13 may be physically coupled to each other by means of a clip or the like. In another example, at least a part of the vent member 16 may be embedded in a film constituting the case 13, for example a sealant resin.

In an embodiment of the present disclosure, the vent member 16 may be located within the extension 15. In another embodiment of the present disclosure, the vent member 16 may be located in the extension 15 through the accommodation portion 13a. In another embodiment of the present disclosure, the vent member 16 may extend outside case 13 through the extension 15. In another embodiment of the present disclosure, the vent member 16 may be located to be exposed out of the case 13 through the accommodation portion 13a via the extension 15.

Figure 3:
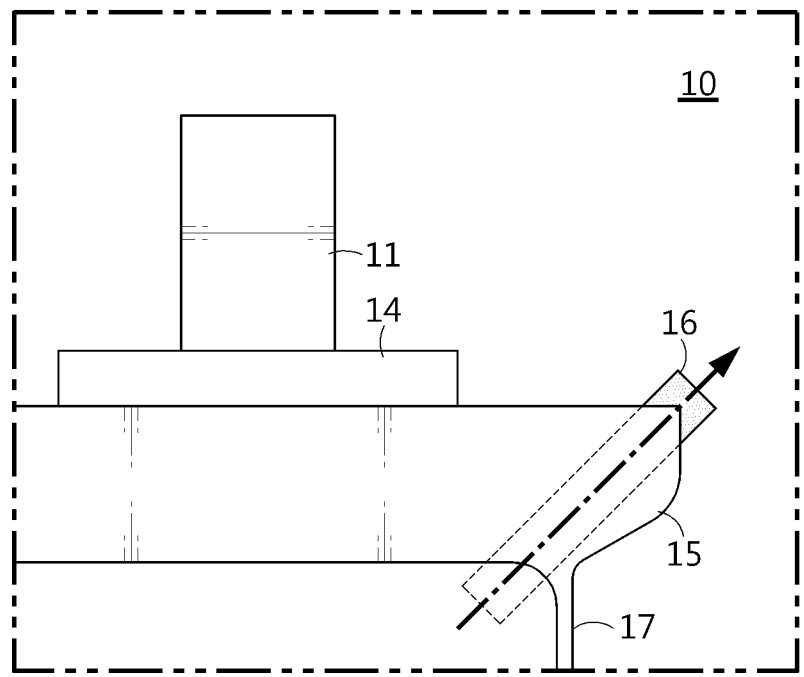
FIG. 3 shows a partial plan view of a secondary battery according to another embodiment of the present disclosure.

FIG. 3 shows a secondary battery 10 according to another embodiment of the present disclosure. Referring to FIG. 3, the vent member 16 may be inclined in extension 15, for example the vent member 16 may have an inclination angle of 10° to 80°, or 20° to 60°, or 40° to 50°. The inclination angle may be defined as an angle between the vent member and the protruding direction of the electrode lead 11.

In an embodiment of the present disclosure, the vent member 16 may not overlap or contact the lead film 14.

The vent member 16 may be positioned to have a region that at least partially overlaps or contacts the lead film 14. As the vent member 16 has at least a partial region that overlaps or contacts the lead film 14, it is easy to consistently and readily fix the position of the vent member 16. For example, when the vent member 16 is inserted and then fused, since a part of the vent member 16 overlaps or contacts the lead film 14, the vent member 16 may be inserted at a predetermined position and then fused.

The vent member 16 may have various shapes to induce or facilitate venting readily. In an embodiment of the present disclosure, the vent member 16 may have a structure that becomes narrower along a venting direction illustrated by direction arrow in FIG. 1. A width of the vent member 16 may be narrowed continuously or discontinuously along the venting direction. When the vent member 16 has a structure that becomes narrower along the venting direction, the exhaust angle of the vented gas may be reduced to minimize the amount of gas vented toward the side portion of the electrode lead 11, thereby further improving the safety of the battery.

Figure 4:
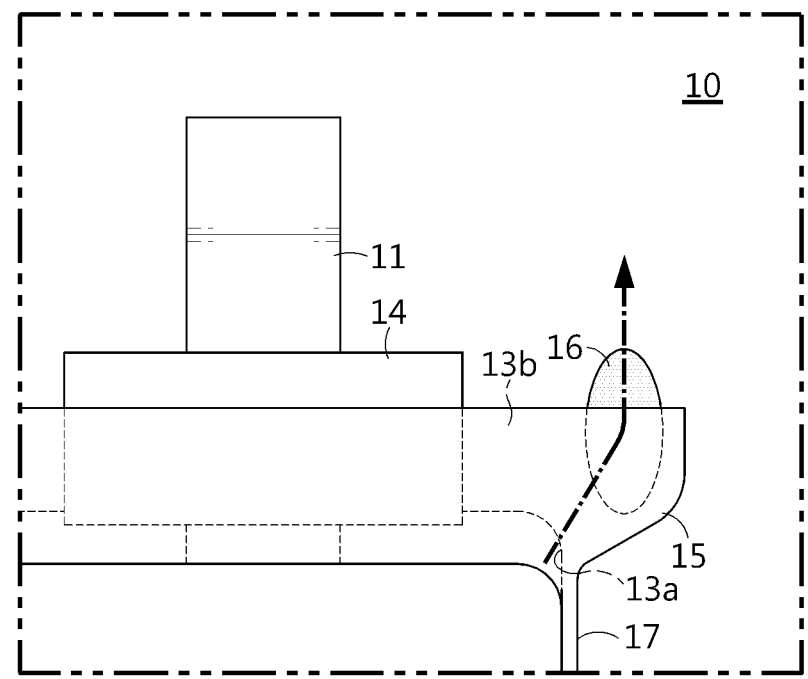
FIG. 4 shows a partial plan view of an electrode lead and a vent member in a secondary battery according to another embodiment of the present disclosure.
Figure 5:
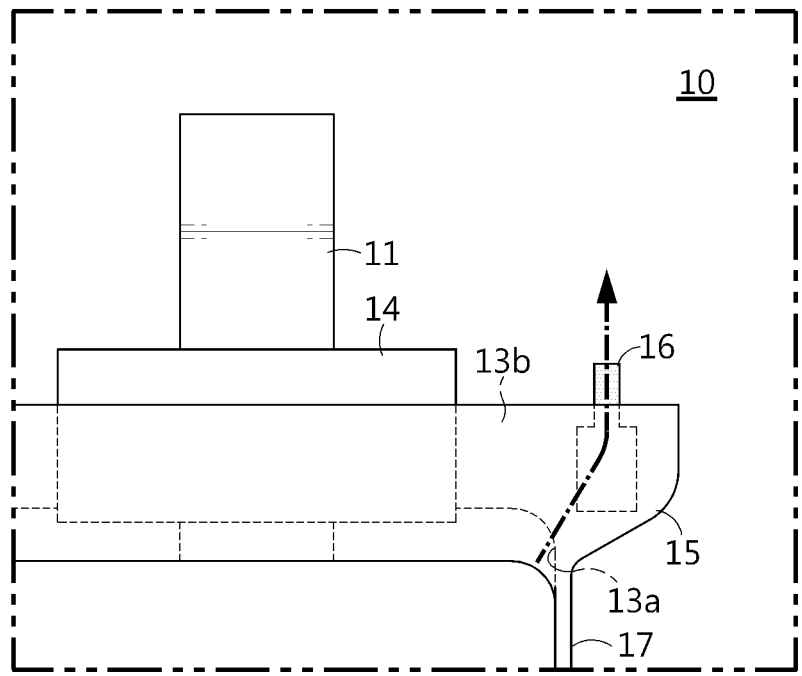
FIG. 5 shows a partial plan view of an electrode lead and a vent member in a secondary battery according to another embodiment of the present disclosure.
Figure 6:
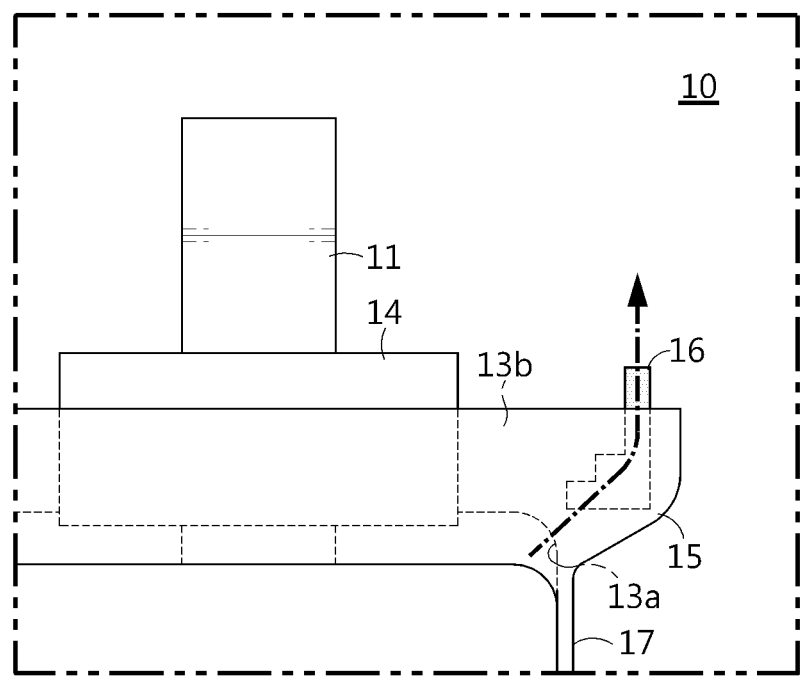
FIG. 6 shows a partial plan view of an electrode lead and a vent member in a secondary battery according to another embodiment of the present disclosure.

FIGS. 4 to 6 are partially enlarged views showing an electrode lead and a vent member in a secondary battery according to other embodiments of the present disclosure.

Referring to FIGS. 4 and 5, the vent member 16 may have, for example, an oval (FIG. 4) or stepped shape (FIG. 5). However, the shape of the vent member 16 may be a circle, a triangle, trapezoid, etc. in other embodiments.

As shown in FIG. 6, the vent member 16 may be an asymmetric stepped structure. In the asymmetric stepped structure, the difference of the steps may be formed to correspond to the side portion of the electrode lead 11. For example, the size (exhaust angle of vented gases) and location (distance from electrode lead 11) of a discharge end of vent member 16 may be configured to minimize contact of the vented gases with electrode lead as best shown in FIG. 6. Thus, reducing the size of the discharge end of the vent member to direct gases away from electrode lead 11 and locating the discharge end away from the electrode lead will minimize any contact between the vented gases and the electrode lead.

Figure 7A:
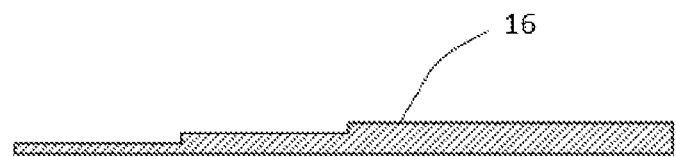
FIG. 7A shows a sectional view of the vent member of FIG. 1 according to an embodiment of the present disclosure.
Figure 7B:
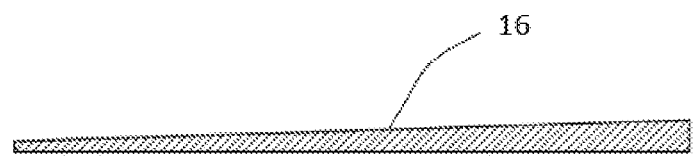
FIG. 7B shows a sectional view of the vent member of FIG. 1 according to another embodiment of the present disclosure.

In an embodiment of the present disclosure, a thickness of the vent member 16 may decrease continuously or discontinuously along the protruding direction of the electrode lead 11. FIGS. 7A and 7B show two embodiments of sections of the vent member of FIG. 1 with variable thickness. Referring to FIG. 7A, the thickness of the vent member 16 may be reduced discontinuously in a stepped shape. FIG. 7B shows a vent member having a thickness that various gradually or continuously.

The vent member 16 may be positioned to be spaced apart from the electrode lead 11 by a predetermined distance. Accordingly, it is easier to minimize the amount of gas vented in a direction that may directly contact the electrode lead 11, namely toward the side portion of the electrode lead 11, thereby further improving the safety of the battery. The electrode lead 11 temperature may rise rapidly in abnormal situations such as overcharge or internal short circuit. Therefore, if direct contact between the vented gas and the electrode lead 11 is minimized, safety may be improved.

In an embodiment of the present disclosure, the vent member 16 may be spaced apart from the lead film 14 in the sealing portion, and the vent member 16 may at least partially overlap or contact the lead film 14 in the accommodation portion 13a. As the vent member 16 does not overlap or contact the lead film 14 in the sealing portion— i.e., vent member 16 being located away from the electrode lead 11, the amount of gas vented toward the side portion of electrode lead 11 may be minimized, thereby further improving safety of the battery.

In an embodiment of the present disclosure, the region where the vent member overlaps or contacts the lead film may be 1% to 30%, or 1.3% to 23%, or 1.5% to 12%, or 2% to 9% of the region where the lead film does not overlap the electrode lead. Here, the region where the lead film does not overlap the electrode lead refers to the sum of both regions of the electrode lead and the lead film that do not overlap.

A part of the vent member 16 and a part of the lead film 14 may overlap or contact each other through thermal fusion. In another example, a part of the vent member 16 and a part of the lead film 14 may overlap or contact each other through an adhesive such as glue. In another example, a part of the vent member 16 and a part of the lead film 14 may be physically coupled to each other through a clip or the like. In another example, a part of the vent member 16 may be embedded in a film constituting the lead film 14.

Figure 8:
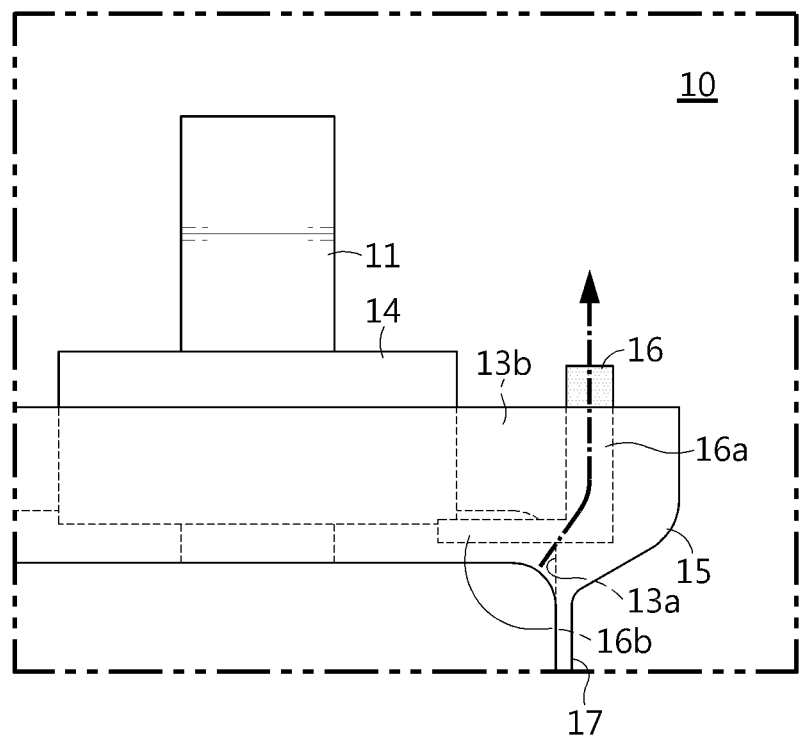
FIG. 8 shows a partial plan view of an electrode lead and a vent member in a secondary battery according to another embodiment of the present disclosure.

FIG. 8 is a partially enlarged view showing an electrode lead 11 and a vent member 16 in a secondary battery according to another embodiment of the present disclosure. Referring to FIG. 8, when the protruding direction of the electrode lead 11 is set as a Y-axis and the direction orthogonal to the Y-axis is set an X-axis, the vent member 16 may include a first portion 16b extending in the X-axis direction, and a second portion 16a extending in the Y-axis direction. First portion 16b extends across or bridges across from second portion 15b to lead film 14 as shown in FIG. 8.

In an embodiment of the present disclosure, the vent member 16 may have an L shape as show in FIG. 8.

Figure 9:
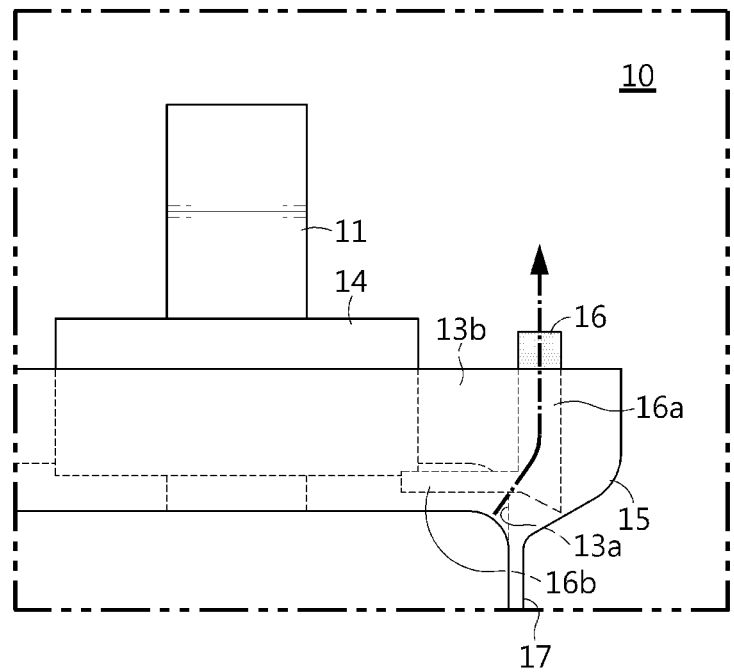
FIG. 9 shows a partial plan view of an electrode lead and a vent member in a secondary battery according to another embodiment of the present disclosure.

In another embodiment of the present disclosure, the vent member 16 may be configured such that an inner end of the second portion 16a is cut as shown in FIG. 9 to form a tapering section. For example, an inner end of the second portion 16a may be cut in a direction non-orthogonal to Y-axis. If the vent member 16 is shaped as above, it is easier to prevent the electrode assembly 12 inside the accommodation portion 13a from contacting the inner end of the second portion 16a. Here, the inner end of the second portion 16a refers to an end of the second portion that is closer to the accommodation portion.

Figure 10:
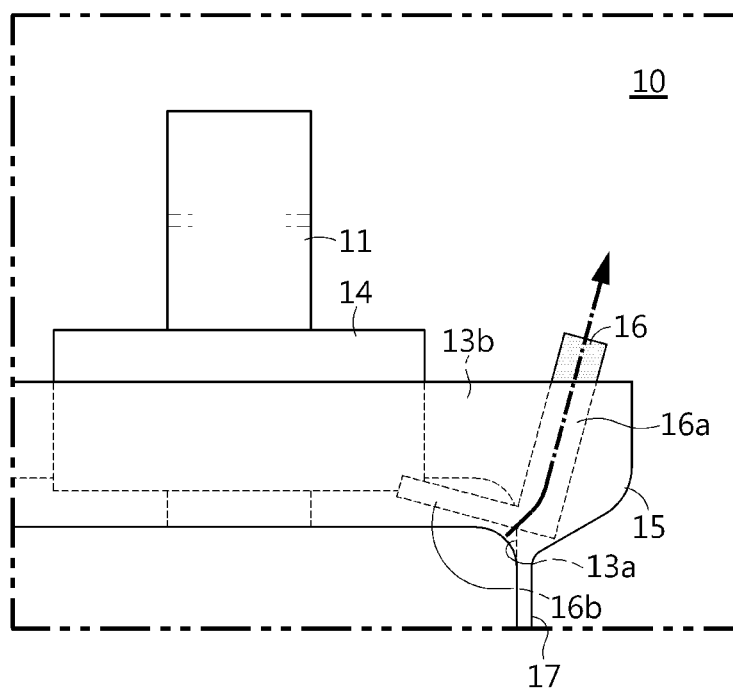
FIG. 10 shows a partial plan view of an electrode lead and a vent member in a secondary battery according to another embodiment of the present disclosure.

FIG. 10 is a partially enlarged view showing an electrode lead 11 and a vent member 16 in a secondary battery according to another embodiment of the present disclosure. Referring to FIG. 10, the first portion may extend along a first direction nonparallel to the Y-axis between the lead film and the second portion. The second portion may extend along a second direction orthogonal to the first direction. For example, when the first direction is set at an angle of 45° with respect to the protruding direction of the electrode lead 11. The vent member 16 may have an L shape.

In another embodiment of the present disclosure, the vent member 16 may be configured such that an inner end of the second portion 16a is cut to form a tapering section. For example, an inner end of the second portion 16a may be cut in a direction non-orthogonal to the second direction. If the vent member 16 is shaped as above, it is easier to prevent the electrode assembly 12 inside the accommodation portion 13a from contacting the inner end of the second portion 16a. Here, the inner end of the second portion 16a refers to an end of the second portion that is closer to the accommodation portion.

In an embodiment of the present disclosure, the second portion 16a such as a body portion may be substantially vented, and the first portion 16b such as a bridge portion may not be substantially vented.

Referring to FIGS. 8 to 10, in an embodiment of the present disclosure, the first portion 16b may have at least a partial region that overlaps or contact lead film 14. As the first portion 16b has at least a partial region that overlaps or contacts lead film 14, it is easy to consistently and readily fix the position of the vent member 16. For example, when the vent member 16 is inserted and then fused, as a part of the first portion 16b overlaps or contact the lead film 14, the vent member 16 may be inserted at a predetermined position and then fused.

A part of the first portion 16b and a part of the lead film 14 may be overlapped or made to contact each other through thermal fusion. In another example, a part of the first portion 16b and a part of the lead film 14 may overlap or contact each other through an adhesive such as glue. In another example, a part of the first portion 16b and a part of the lead film 14 may be physically coupled to each other through a clip or the like. In another example, a part of the first portion 16b may be embedded in a film constituting the lead film 14.

Referring to FIGS. 8 to 10, in an embodiment of the present disclosure, the second portion 16a of the vent member 16 and the lead film 14 may not be overlap or contact each other. For example, the second portion 16a and the lead film 14 may not overlap or contact each other in the sealing portions. When the second portion 16a of the vent member 16 and the lead film 14 are not overlapped or made to contact each other, the amount of gas vented toward the side portion of the electrode lead 11 may be minimized, thereby further improving the safety of the battery.

Referring to FIGS. 8 to 10, the outer end of the first portion 16b may be spaced apart from the inner end of the extension 15. Here, the "outer end of the first portion of the vent member" refers to an end of the first portion 15b that is closer to the extension. The term "inner end of the extension" means an end of the sealing portion where the extension is adjacent to the accommodation portion. In this case, the entire first portion 16b may be located within the accommodation portion 13a. Accordingly, the gap or space between the first portion 16b and the extension 15 may be exposed to the accommodation portion 13a, and as a result, the pressure of the gas is concentrated at this gap or space facilitating vent formation in abnormal situations.

In an embodiment of the present disclosure, the first portion 16b may have a rectangular shape. For example, the long side of the first portion may be positioned in the X-axis direction and the short side of the first portion may be positioned in the Y-axis direction. In an embodiment of the present disclosure, the second portion 16a may have a rectangular shape. For example, a short side of the second portion of the rectangular shape may be positioned in the X-axis direction and a long side of the second portion of the rectangular shape may be positioned in the Y-axis direction.

Figure 11:
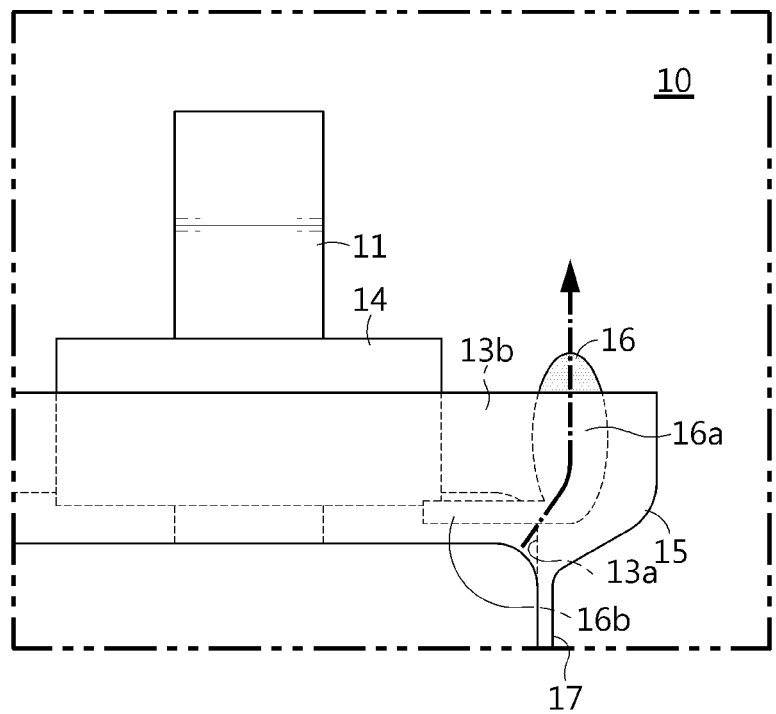
FIG. 11 shows a partial plan view of an electrode lead and a vent member in a secondary battery according to another embodiment of the present disclosure.
Figure 12:
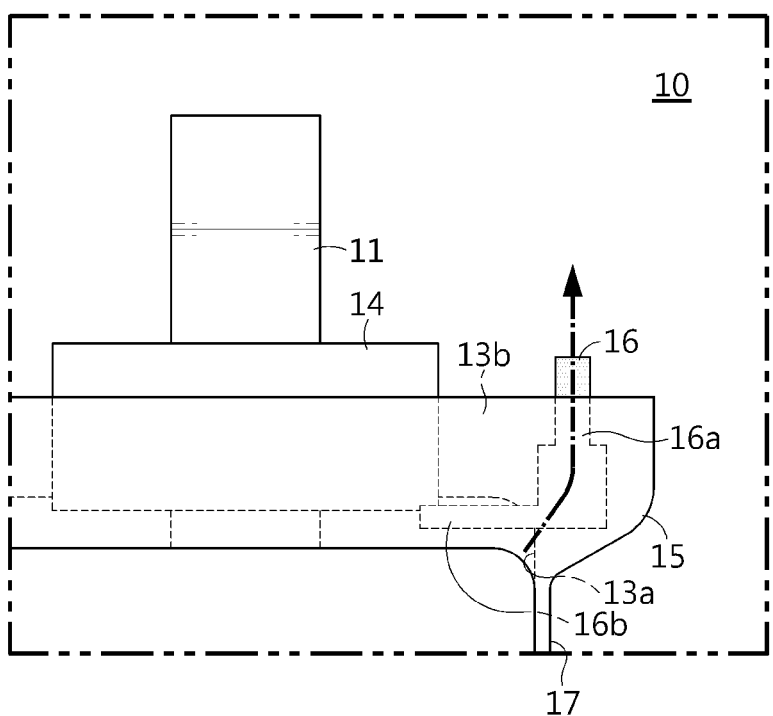
FIG. 12 shows a partial plan view of an electrode lead and a vent member in a secondary battery according to another embodiment of the present disclosure.
Figure 13:
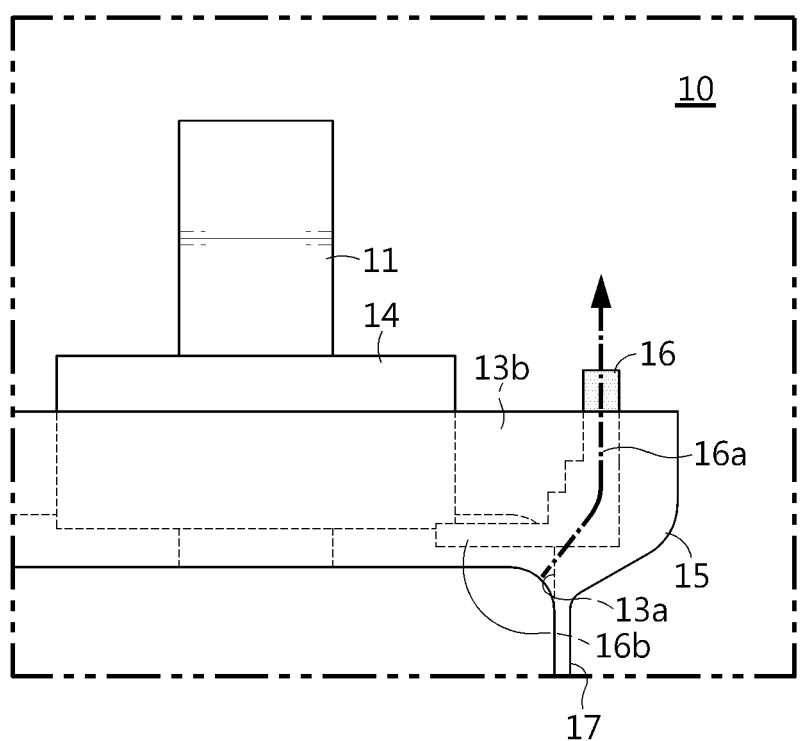
FIG. 13 shows a partial plan view of an electrode lead and a vent member in a secondary battery according to another embodiment of the present disclosure.

FIGS. 11 to 13 are partially enlarged views showing a lead film and a vent member in a secondary battery according to other embodiments of the present disclosure.

Referring to FIGS. 11 to 13, as described above, the vent member 16 may include a first portion 16b and a second portion 16a, and the second portion 16a may have, for example, an oval or a stepped shape. However, the shape of the second portion 16a may be a circle, a triangle, or a trapezoid, etc. in other embodiments.

Also, referring to FIG. 13, the second portion 16a may be an asymmetric stepped structure. In the asymmetric stepped structure, the difference of the steps may be formed to correspond to the side portion of the electrode lead 11. For example, the size (exhaust angle of vented gases) and location (distance from electrode lead 11) of a discharge end of second portion 16 may be configured to minimize contact of the vented gases with electrode lead as best shown in FIG. 13. Thus, reducing the size of the discharge end of the second portion to direct gases away from electrode lead 11 and locating the discharge end away from the electrode lead will minimize any contact between the vented gases and the electrode lead.

In an embodiment of the present disclosure, the vent member 16 may be vented at 100° C. to 120° C. Also, the vent member 16 may be vented at a pressure of 1.5 atm or more.

As the vent member 16 is vented in the aforementioned temperature range and/or the aforementioned pressure condition, it is easier to seal the battery during normal operation of the battery and to induce the gas to be discharged only during an abnormal operation of the battery.

In an embodiment of the present disclosure, the vent resin having a lower melting point than the sealant resin may contain linear low-density polyethylene having a comonomer with a carbon number of 6 or more. As the vent resin having a lower melting point than the sealant resin contains linear low-density polyethylene having a comonomer with a carbon number of 6 or more, excellent fusion with the sealant resin may be secured in the normal temperature range, and the sealing strength of the sealing portion including the vent member 16 may be lowered at high temperatures to realize vent characteristics.

In an embodiment of the present disclosure, the vent resin having a lower melting point than the sealant resin may contain linear low-density polyethylene having a comonomer with a carbon number of 6 to 8.

In an embodiment of the present disclosure, the vent resin having a lower melting point than the sealant resin may have a melting point of 100° C. to 130° C., or 105° C. to 125° C., or 110° C. to 120° C. If the melting point of the vent resin satisfies the above-mentioned range, the sealing strength of the sealing portion including the vent member 16 may be lowered at a high temperature, for example 100° C. or higher, so that the vent characteristic may be implemented more easily.

The melting point of the vent resin having a lower melting point than the sealant resin may be measured using a differential scanning calorimeter (DSC). For example, the temperature of a sample is increased from 30° C. to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the melting point may be measured by maintaining the temperature at 280° C. for 10 minutes.

In an embodiment of the present disclosure, the vent member may have a maximum sealing strength of less than 6 kgf/15 mm or less than 5 kgf/15 mm or less than 4.5 kgf/15 mm at 100° C. or higher. In an embodiment of the present disclosure, the vent member 15 may have a maximum sealing strength of less than 6 kgf/15 mm or less than 5 kgf/15 mm or less than 4.5 kgf/15 mm at 100° C. to 120° C. In an embodiment of the present disclosure, the vent member 16 may have a maximum sealing strength of less than 3 kgf/15 mm or less than 2 kgf/15 mm or less than 1 kgf/15 mm or less than 0.5 kgf/15 mm at 120° C. or higher. If the vent member satisfies the above-mentioned sealing strength in the above-mentioned temperature range, the sealing strength of the sealing portion including the vent member 16 may be lowered at a high temperature, for example 100° C. or higher, so that the vent characteristic may be implemented more easily.

In addition, in an embodiment of the present disclosure, the vent member may have a maximum sealing strength of 6 kgf/15 mm or more or 8 kgf/15 mm or more or 10 kgf/15 mm or more at room temperature to 60° C. If the vent member satisfies the above-mentioned sealing strength in the above temperature range, excellent sealing strength may be secured during normal operation of the battery, which may easily secure the sealing property of the battery.

In an embodiment of the present disclosure, the vent member may have a maximum sealing strength of less than 6 kgf/15 mm at 100° C. or higher, and the vent member may have a maximum sealing strength of 6 kgf/15 mm or more at room temperature to 60° C. If the vent member satisfies the sealing strength described above, the sealing strength of the sealing portion including the vent member 16 may be lowered at a high temperature, so that the vent characteristic may be implemented more easily. In addition, since excellent sealing strength is secured during normal operation of the battery, the sealing property of the battery may be easily secured.

In an embodiment of the present disclosure, the vent member may have an average sealing strength of less than 4.5 kgf/15 mm or less than 3 kgf/15 mm at 100° C. or above. In an embodiment of the present disclosure, the vent member 16 may have an average sealing strength of less than 4.5 kgf/15 mm or less than 3 kgf/15 mm at 100° C. to 120° C. In an embodiment of the present disclosure, the vent member 16 may have an average sealing strength of less than 2 kgf/15 mm or less than 1 kgf/15 mm or less than 0.5 kgf/15 mm at 120° C. or higher. If the vent member satisfies the above-mentioned sealing strength in the above-mentioned temperature range, the sealing strength of the sealing portion including the vent member 16 may be lowered at a high temperature, so that the vent characteristic may be implemented more easily.

In an embodiment of the present disclosure, the vent member may have an average sealing strength of 4.5 kgf/15 mm or more or 5 kgf/15 mm or more or 6 kgf/15 mm or more or 7 kgf/15 mm or more at room temperature to 60° C. If the vent member satisfies the above-mentioned sealing strength in the above temperature range, excellent sealing strength may be secured during normal operation of the battery, thereby easily securing the sealing property.

In an embodiment of the present disclosure, the vent member may have an average sealing strength of less than 4.5 kgf/15 mm at 100° C. or above, and the vent member may have an average sealing strength of 4.5 kgf/15 mm or more at room temperature to 60° C. If the vent member has the above-mentioned sealing strength in the above-described temperature range, the sealing strength of the sealing portion including the vent member 16 may be lowered at a high temperature, so that the vent characteristic may be easily implemented. In addition, since excellent sealing strength is secured during normal operation of the battery, the sealing property of the battery may be easily secured.

The sealing strength of the vent member according to temperature may be measured by conducting a tensile test at a speed of 5 mm/min, after cutting the part of the case in which the vent member is inserted into a width of 15 mm and a length of 5 cm and then grasping both ends thereof using a UTM jig in a state where both ends are spread to 180°.

At this time, a "maximum sealing strength" means a maximum value when the case is broken, and an "average sealing strength" means an average value when the case is stretched by 8 mm at 4.5 kgf/15 mm when the maximum sealing strength is 4.5 kgf/15 mm or more and an average value when the case is stretched by 8 mm at the maximum sealing strength when the maximum sealing strength is less than 4.5 kgf/15 mm.

In an embodiment of the present disclosure, the vent resin may be polymerized in the presence of a metallocene catalyst. If the vent resin is polymerized in the presence of a metallocene catalyst, it may be more advantageous in terms of sealing strength and properties, compared to the case where it is polymerized in the presence of a Ziegler-Natta catalyst.

In an embodiment of the present disclosure, the content of the comonomer with a carbon number of 6 or more in the linear low-density polyethylene having a comonomer with a carbon number of 6 or more may be 15 weight % or less, or 12 weight % or less, or 11.8 weight % or less, or 10 weight % or less, or 9 weight % or less, or 8 weight % or less, or 7.6 weight % or less, based on 100 weight % of the linear low-density polyethylene having a comonomer with a carbon number of 6 or more. At the same time, it may be 5 weight % or more, or 7.6 weight % or more, or 8 weight % or more, or 9.0 weight % or more, or 10 weight % or more, or 11.8 weight % or more, or 12 weight % or more. If the content of the comonomer with a carbon number of 6 or more satisfies the above-mentioned range, it may be easy to ensure that the sealing strength is not lowered during normal operation of the battery due to a decreased packing density between molecules.

The content of the comonomer with a carbon number of 6 or more may be measured using an H-NMR. For example, after about 10 mg of a sample is completely dissolved in about 0.6 mL of trichloroethylene solvent using a heat gun, it may be sampled in an NMR tube and measured using the 1H-NMR or 13C-NMR analysis method.

In an embodiment of the present disclosure, the vent resin having a lower melting point than the sealant resin may have a weight-average molecular weight of 100,000 g/mol to 400,000 g/mol, or 200,000 g/mol to 350,000 g/mol, or 230,000 g/mol to 300,000 g/mol. If the vent resin satisfies the above-described range, the sealing strength with the sealant resin may be more excellent during normal operation of the battery.

In an embodiment of the present disclosure, the vent resin having a lower melting point than the sealant resin may have a poly dispersity index (PDI) of 4 or less, or 3.8 or less, or 3.796 or less, or 3.5 or less, or 3.023 or less, or 3 or less, or 2.7 or less, or 2.674 or less. In addition, the poly dispersity index (PDI) may be 1.0 or more. If the vent resin satisfies the above range, the molecular weight distribution is narrow, so the sealing strength with the sealant resin and the properties may be improved during normal operation of the battery.

The weight-average molecular weight and the poly dispersity index of the vent resin having a lower melting point than the sealant resin may be measured by gel permeation chromatography (GPC) under the following conditions:
 column: Tosoh, HLC-8321 GPC/HT
 solvent: TCB (Trichlorobenzene)+0.04% BHT (after drying with 0.1% $CaCl_2$)
 flow velocity: 1.0 ml/min
 sample concentration: 1.5 mg/ml
 dose: 300 μl
 column temperature: 160° C.
 Detector: RI detector
 Standard: Polystyrene (calibrated with a third-order function)

In an embodiment of the present disclosure, the crystallization temperature of the sealant resin and the crystallization temperature of the vent resin having a lower melting point than the sealant resin may be similar. For example, the difference between the crystallization temperature of the sealant resin and the crystallization temperature of the vent resin may be 10° C. or less, or 5° C. or less. In addition, the difference between the crystallization temperature of the sealant resin and the crystallization temperature of the vent resin may be 0.1° C. or more. If the difference between the crystallization temperature of the sealant resin and the crystallization temperature of the vent resin satisfies the above range, the sealant resin and the vent resin may have improved fusion characteristic during normal operation of the battery.

In an embodiment of the present disclosure, the vent resin having a lower melting point than the sealant resin may have a crystallization temperature of 90° C. to 115° C., or 95° C. to 110° C., or 100° C. to 110° C., or 105° C. to 110° C. If the vent resin satisfies the above range, the sealant resin and the vent resin may have improved fusion characteristics.

The crystallization temperature may be measured using a differential scanning calorimeter (DSC). For example, the temperature of the sample may be increased from 30° C. to 280° C. at 10° C./min, maintained at 280° C. for 10 minutes, cooled to 30° C. at 10° C./min, and then maintained at 30° C. for 10 minutes. Then, after increasing the temperature of the sample from 30° C. to 280° C. at 10° C./min, the crystallization temperature may be measured by maintaining the temperature at 280° C. for 10 minutes.

In an embodiment of the present disclosure, the vent member 16 may have a thickness of a film.

The vent member 16 may be formed to have a predetermined thickness of a preset size. In addition, the vent member 16 may be inserted into the extension 15 so that its insertion length can be varied, or its venting pressure and position can be controlled depending on the design requirements.

In an embodiment of the present disclosure, the vent member 16 may further include an adhesive layer for improved placement and sealing between the sealant resin and the vent resin having a lower melting point than the sealant resin.

Since the secondary battery according to an embodiment of the present disclosure includes the vent member having a vent resin with a lower melting point than the sealant resin at the extension, when thermal propagation occurs, directional venting for discharging gas toward the extension by lowering the sealing strength at high temperature may be implemented readily and efficiently.

In an embodiment of the present disclosure, the secondary battery may be a cylindrical, prismatic, or pouch-type secondary battery.

Even though preferred embodiments of the present disclosure has been illustrated and described above, the present disclosure is not limited to the specific embodiments described above, and the present disclosure can be modified in various ways by those skilled in the art without departing from the gist of the present disclosure defined in the claims, and these modifications should not be individually understood from the technical idea or prospect of the present disclosure.

The invention claimed is:

1. A secondary battery, comprising:
an electrode assembly;
an electrode lead attached to the electrode assembly;
a case including an accommodation portion defined by a bent side and a sealing portion, the accommodation portion configured to receive the electrode assembly therein, the sealing portion containing a sealant resin to form a seal around the electrode assembly;
wherein the sealing portion includes an extension adjacent to and extending away from the bent side at one end of the bent side such that a central portion of the bent side is recessed toward the accommodation portion with respect to the extension, and
a vent member disposed at least partially in the extension, the vent member including a vent resin having a lower melting point than the sealant resin.

2. The secondary battery according to claim 1, further including a lead film surrounding an outer surface of the electrode lead, the lead film being disposed between the electrode lead and the sealing portion,
wherein the vent member extends through the accommodation portion,
a first end of the vent member being spaced apart from the lead film in the sealing portion, and a second end of the vent member at least partially overlapping or contacting the lead film in the accommodation portion.

3. The secondary battery according to claim 1, further including a lead film surrounding an outer surface of the electrode lead, the lead film being disposed between the electrode lead and the sealing portion,
the electrode lead extending away from the case along a Y-axis, the vent member including a first portion and a second portion, the first portion extending along an X-axis orthogonal to the Y-axis between the lead film and the second portion, the second portion extending along the Y-axis.

4. The secondary battery according to claim 1, further including a lead film surrounding an outer surface of the electrode lead, the lead film being disposed between the electrode lead and the sealing portion, the electrode lead extending away from the case along a Y-axis, the vent member including a first portion and a second portion, the first portion extending along a first direction nonparallel to the Y-axis between the lead film and the second portion, the second portion extending along a second direction orthogonal to the first direction.

5. The secondary battery according to claim 3, wherein the vent member has an L shape.

6. The secondary battery according to claim 3, wherein the vent member includes a tapering section at an intersection of the first and second portions, the tapering section extending into the accommodation portion.

7. The secondary battery according to claim 3, wherein the first portion is a bridge portion at least partially overlapping the lead film.

8. The secondary battery according to claim 3, wherein an outer end of the first portion is spaced apart from a inner end of the extension, the first portion being located in the accommodation portion.

9. The secondary battery according to claim 3, wherein the second portion does not overlap or contact the lead film.

10. The secondary battery according to claim 1, wherein the vent member defines a variable width, the variable width decreasing along a venting direction.

11. The secondary battery according to claim 1, wherein the vent member defines any of a circular, oval, stepped, triangular and trapezoidal shape.

12. The secondary battery according to claim 1, wherein the vent member defines a variable thickness, the variable thickness decreasing along a venting direction.

13. The secondary battery according to claim 2, wherein a region of the vent member overlapping or contacting the lead film is 1% to 30% of a region of the lead film not overlapping or contacting the electrode lead.

14. The secondary battery according to claim 1, wherein the vent resin includes a linear low-density polyethylene having a comonomer with a carbon number of 6 or more.

15. The secondary battery according to claim 1, wherein the vent member melts at 100° C. to 120° C. to vent gases from the accommodation portion to an exterior of the secondary battery.

16. The secondary battery according to claim 15, wherein the vent member vents gases from the accommodation portion when the accommodation portion is at a pressure of 1.5 atm or above.

17. The secondary battery according to claim 1, wherein the vent member has a maximum sealing strength of less than 6 kgf/15 mm at 100° C. or above.

18. The secondary battery according to claim 1, wherein the vent member has an average sealing strength of less than 4.5 kgf/15 mm at 100° C. or above.

19. The secondary battery according to claim 1, wherein the vent member has a maximum sealing strength of 6 kgf/15 mm or more at room temperature to 60° C.

20. The secondary battery according to claim 1, wherein the vent member has an average sealing strength of 4.5 kgf/15 mm or more at room temperature to 60° C.

21. The secondary battery according to claim 1, wherein the vent resin is polymerized in the presence of a metallocene catalyst.

22. The secondary battery according to claim 14, wherein the comonomer with a carbon number of 6 or more is 15 weight % or less, based on 100 weight % of the linear low-density polyethylene.

23. The secondary battery according to claim 1, wherein the vent resin has a poly dispersity index (PDI) of 4 or less.

24. The secondary battery according to claim 1, wherein a difference between a crystallization temperature of the sealant resin and a crystallization temperature of the vent resin is 10° C. or less.

25. The secondary battery according to claim 1, wherein the vent resin has a melting point of 100° C. to 130° C.

26. The secondary battery according to claim 1, wherein the vent resin has a weight-average molecular weight of 100,000 g/mol to 400,000 g/mol.

27. The secondary battery according to claim 1, wherein the secondary battery is a pouch-type secondary battery.

28. The secondary battery according to claim 1, wherein the vent member has a maximum sealing strength of less than 3 kgf/15 mm at 120° C. or more.

29. The secondary battery according to claim 1, wherein the vent member has an average sealing strength of less than 2 kgf/15 mm at 120° C. or more.

* * * * *